United States Patent [19]

Premerlani

[11] 4,398,255

[45] Aug. 9, 1983

[54] POLYPHASE ANGLE ESTIMATOR

[75] Inventor: William J. Premerlani, Scotia, N.Y.

[73] Assignee: General Electric Company, Schenectady, N.Y.

[21] Appl. No.: 277,789

[22] Filed: Jun. 26, 1981

[51] Int. Cl.³ .................... H02H 3/16; H02H 3/18
[52] U.S. Cl. ........................... 364/492; 364/481; 361/80; 361/82
[58] Field of Search ............ 364/481, 492; 361/80, 361/82

[56] References Cited

U.S. PATENT DOCUMENTS

| | | | |
|---|---|---|---|
| 3,673,425 | 6/1972 | Plichta | 361/82 X |
| 3,697,811 | 10/1972 | Little | 361/82 |
| 3,931,502 | 1/1976 | Kohlas | 364/481 X |
| 3,983,377 | 9/1976 | Vitins | 364/481 |
| 4,156,280 | 5/1979 | Griess | 364/481 |
| 4,161,011 | 7/1979 | Wilkinson | 361/80 |
| 4,321,681 | 3/1982 | Sackin et al. | 364/492 |
| 4,329,727 | 5/1982 | Premerlani | 361/82 X |
| 4,371,947 | 2/1983 | Fujisawa | 364/492 X |

FOREIGN PATENT DOCUMENTS 1517551  7/1978  United Kingdom .

OTHER PUBLICATIONS

Dommel et al., "High Speed Relaying Using Traveling Wave Transient Analysis", Paper A-78-214-9, IEEE PES 1978 Winter Meeting, New York, NY.

Esztergalyos et al., "Development, Design Application and Field Experience of an Ultra High Speed Relaying System for EHV/UHV Transmission Lines", Pennsylvania Electric Association Relay Committee Mtg., Oct. 1978, Harrisburg, Pennsylvania.

Takagi et al., "Digital Differential Relaying System for Transmission Line Primary Protection Using Traveling Wave Theory-Its Theory and Field Experience," Paper A-79-096-9, IEE PES 1979 Winter Meeting, New York, NY.

General Electric Co., "Type SLYP-SLCN Static Directional Comparison Relaying Description and Application", 1978.

Gallen, et al., "A Digital System For Directional-Comparison Relaying", IEEE Transactions on Power Apparatus and Systems, vol. PAS-98, No. 3, May/Jun., 1979.

Chen, et al., "Field Experience With a Digital System For Transmission Line Protection", IEEE Transactions on Power Apparatus and Systems, vol. PAS-98, No. 5, Sep./Oct. 1979.

Lee, et al., "An Ultrafast Fault Sensor For a Fault Current Limiting Device", IEEE, vol. PAS-98, No. 3, May/Jun. 1979.

Takagi, et al., "Fault Protection Based on Travelling Wave Theory—Part I Theory", 1977.

*Primary Examiner*—Edward J. Wise
*Attorney, Agent, or Firm*—Paul J. Checkovich; James C. Davis, Jr.; Marvin Snyder

[57] ABSTRACT

A high speed relay for detecting multiphase faults using operating and polarizing signals from static transmission line protective relays provides an instantaneous estimate of the relative phase angle between relay signals without any loss of relay security.

4 Claims, 3 Drawing Figures

POLYPHASE ANGLE ESTIMATOR

BACKGROUND OF THE INVENTION

This invention relates to my copending application entitled "Directional Power Distance Relay", Ser. No. 169,434, filed July 16, 1980 and assigned to the same assignee as the present invention, now U.S. Pat. No. 4,329,727.

This invention relates to electric power system relaying, and, more particularly, to high-speed relays for rapidly detecting multiphase faults which occur on power system transmission lines.

As power systems have grown in the power transmission industry, the time available for protective equipment to remove faults and still maintain power system stability has been significantly reduced. There are two ways of keeping pace with system stability requirements; either faster relays or faster circuit breakers are required. The instant invention is directed to reducing relay response time.

Conventional transmission line relays have reached an apparent response time limit of about 4 milliseconds, with a state-of-the-art limit of about 2.5 msec. To achieve faster response time in these conventional systems, system security would have to be compromised. System security requires that spurious operation inputs be ignored, so that system circuit breakers are not opened incorrectly during system disturbances that normally occur, but which do not interfere with system performance.

One approach to reducing relay time employs traveling wave concepts. These methods have been described by Dommel et al., "High Speed Relaying Using Traveling Wave Transient Analysis", Paper A78-214-9, IEEE PES 1978 Winter Meeting, New York, N.Y. and by Esztergalyos et al., "Development, Design, Application and Field Experience of an Ultra High Speed Relaying System for EHV/UHV Transmission Lines", Paper presented at the Pennsylvania Electric Association Relay Committee Meeting, October, 1978, Harrisburg, Pennsylvania. Because of the possibility of spurious input signals, the first wavefront to be received at the relay employing traveling wave concepts cannot be used by itself to make an operating decision. Some form of filtering, integrating or averaging of the signal must be done. The result is that the schemes respond not only to the first wavefront, but also to subsequent reflections of the first wavefront. Furthermore, since traveling waves can propagate through an entire power system, traveling wave schemes per se do not determine fault location. Although traveling wave schemes can be made to have distance properties by introducing a threshold, determining the faults magnitude precisely can be done only by extensive computer simulations. For these and other reasons including mutual coupling between adjacent lines on the same right-of-way, traveling wave schemes are not secure and are subject to generating incorrect trip signals during normal power system disturbances, such as switching surges and loss of communications channels, and can also trip the wrong circuit breakers during genuine short circuits.

Other techniques have been employed to achieve high speed relaying on transmission lines. For example, a fault simulation technique described in British Pat. No. 1,517,551, issued to Hughes Aircraft Co. on July 12, 1978, can rapidly detect single line to ground faults by comparing measured waveforms with simulated waveforms. However, the technique does not work well for multi-phase faults. As an example of a digital scheme, Takagi et al., "Digital Differential Relaying System for Transmission Line Primary Protection Using Traveling Wave Theory-Its Theory and Field Experience", Paper A-79-096-9, IEEE PES 1979 Winter Meeting, New York, N.Y., describe a method which compares the currents at opposite ends of the transmission line. However, the method cannot provide first zone distance protection without a reliable communications channel to link the line terminals.

Many conventional electronic power system relays utilize relative phase angles between signals derived from power system voltages and currents to discriminate between normal and abnormal conditions. Signals derived from voltage transformers and current transformers are combined in various ways using operations such as electronic summation, filtering, amplification, delay, squaring and thresholding. Two typical signals produced in this fashion are called polarizing voltage and operating voltage signals. A preselected angle represents the boundary between normal and abnormal power system conditions. A coincidence detector determines if the angle between the derived signals is greater or less than a critical value. This is done by measuring the time between zero crossings of the two signals. When both signals have the same sign, a timer is activated. If both signals have the same sign for a time interval greater than the timer setting, the coincidence detector generates an output. If one of the signals changes sign before the end of the preset interval, the timer is reset and no output is generated.

In a three phase power system, three or more relay circuits are needed. Although each circuit may accept inputs from all three phases, each circuit generally responds only to faults associated with the phase or pair of phases that it is protecting. Electronic logic accepts inputs from all circuits and selects the breakers that should be tripped. In some arrangements, all three phases are tripped for any type of fault. In others, one phase is tripped for a single line to ground fault and all three phases are tripped for all other types of faults.

Because the coincidence detector of conventional relays cannot produce an output until its timer times out, conventional relays have an inherent speed limitation. To some extent, conventional schemes can be made to respond more quickly by reducing the setting of the coincidence detector's timer. However, doing so moves the boundary between normal and abnormal conditions, making the relay more sensitive and less secure.

It is an object of the present invention to provide ultra high speed multiphase fault detection without any loss of relay security.

It is another object of the present invention to provide an instantaneous estimate of the relative phase angle between relay signals for multiphase fault detection.

SUMMARY OF THE INVENTION

According to the present invention, an apparatus is provided for multiphase fault protection of power transmission lines. A high speed estimate of the relative phase angle of a set of polyphase signals is accomplished using a polarizing signal and an operating signal available from a static transmission line protective relay associated with each phase of the transmission line. The static transmission line protective relays are connected to transmission line voltages and currents. The polarizing signal relating to one phase of the transmission line is multiplied by an operating signal relating to the same phase and the product for each phase is coupled to a different input of a summer. A signal indicative of the average amplitude of all the polarizing voltages and a signal indicative of the average amplitude of all the operating voltages are generated. These two signals are multiplied together and adjusted by a predetermined gain which is determined by the balance angle. The balance angle represents the boundary between normal and abnormal power system conditions and determines the reach characteristic. The signal adjusted by the gain is coupled to a negative input on the summer. The output of the summer when it is above a predetermined value indicates an abnormal condition indicative of multiphase fault within a predetermined reach. Three phase faults can be detected almost instantaneously with only filter and traveling wave delay. Two phase faults take no longer than 4.1 milliseconds to be detected.

BRIEF DESCRIPTION OF THE DRAWING

The features of the invention believed to be novel are set forth with particularity in the appended claims. The invention itself, however, both as to organization and method of operation, together with further objects and advantages thereof, may best be understood with reference to the following description taken in conjunction with the accompanying drawing in which:

DETAILED DESCRIPTION OF THE DRAWING

Figure 1:
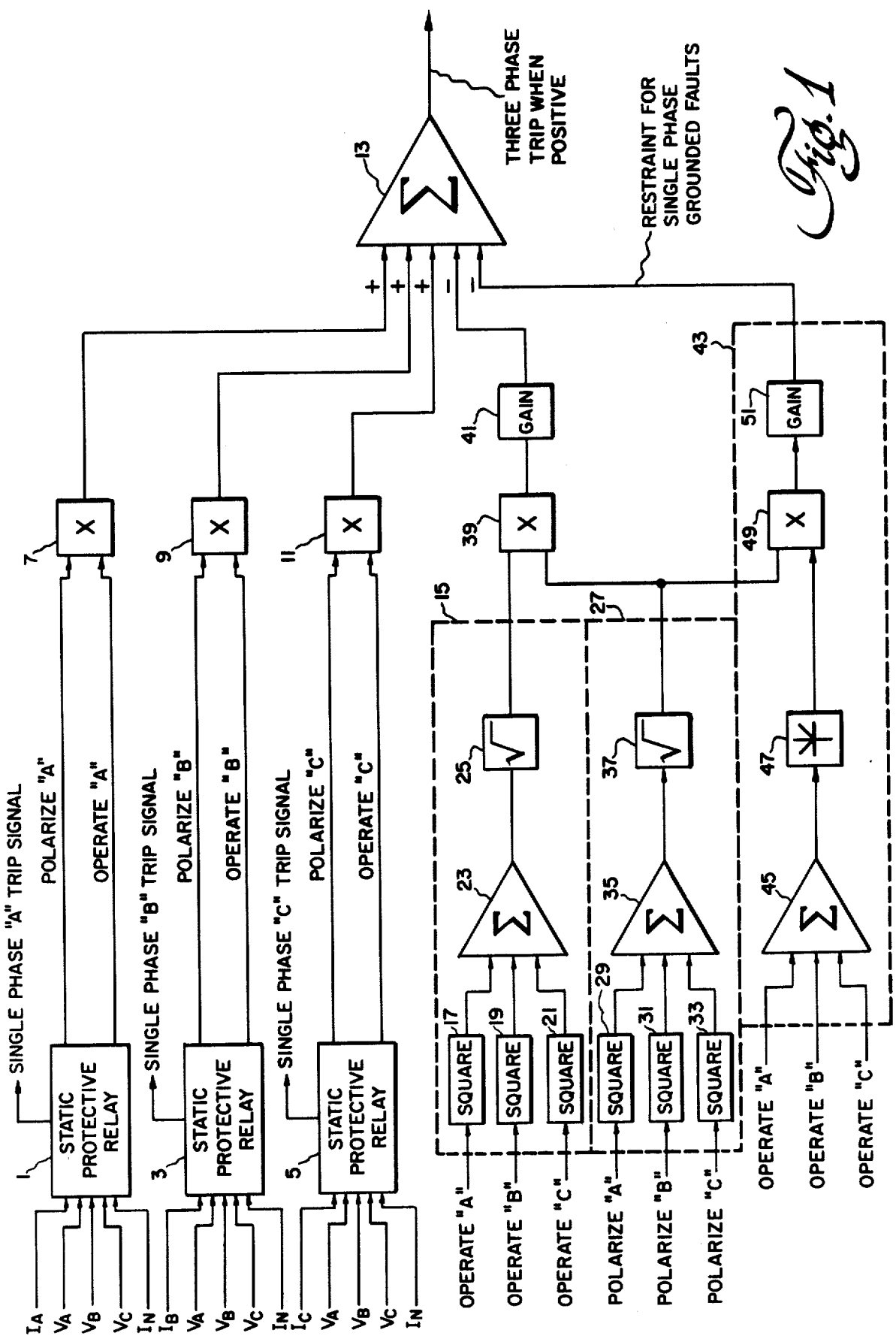
FIG. 1 is a block diagram representation of the present invention.

Referring now to the Figures, especially FIG. 1 thereof, an apparatus for providing high speed detection of multiphase faults is shown. Static transmission line protective relays 1, 3, and 5 can be any of a wide range of conventional static relay types using relative phase angles between signals derived from power system currents and voltages to discriminate between normal and abnormal conditions. For each phase of the transmission line, a polarizing and operating signal may be derived from the line currents and line to neutral voltages. For example, in one phase of a typical ground distance relay, polarizing voltage signals are generated by passing the line to neutral voltage signals through filters tuned to 60 Hz with a modest Q in the range of 2 to 20. These filters are sometimes referred to as memory circuits since they continue to produce a 60 Hz output for a short time after the inputs have been removed. Operating voltage signals are formed from input voltages and currents and a replica impedance. The replica impedance is generally set to a certain fraction of the protected transmission line and determines the reach of the relay. For example, a replica impedance of 80% of the line impedance will set the relay to detect faults closer than 80% of the length of the line.

Operating voltage signals from the static relay are required which do not include zero sequence compensation. $V_A$, $V_B$, $V_C$ denote three phase input voltages which may be line-to-ground, line-to-line or any linear combination thereof. Similarly, $I_A$, $I_B$, and $I_C$ are three phase currents which may correspond to line currents or difference currents betwen line pairs. $I_N$ is a neutral current of the transmission line. Each relay 1, 3 and 5 provides a single phase trip signal when appropriate by conventional means. The polarize and operate signals associated with each phase are multiplied together in multipliers 7, 9 and 11 external to the static transmission line protective relays 1, 3 and 5. The result of each multiplication is coupled through a separate positive input of a summer 13. Each of the operate signals from the relays is coupled to an average magnitude generator 15 which takes the square root of the sum of the squares over the three phases. The average magnitude generator comprises three squaring circuits 17, 19 and 21, a summer 23 and a square root extractor 25. The squaring circuits 17, 19 and 21 each receive an operate signal from a respective static protective relay 1, 3 and 5. The output of each squaring circuit is summed in summer 23 and the square root of the output of summer 23 is extracted in circuit 25. Similarly, each of the operate signals is coupled to an average magnitude generator 27 which takes the square root of the sum of the squares over the three phases of the polarizing signals. The average magnitude generator 27 comprises three squaring circuits 29, 31 and 33, a summer 35 and a square root extractor 37. The squaring circuits 29, 31 and 33 each receives a polarizing signal from a respective static protective relay 1, 3 and 5. The output of each squaring circuit is summed in summer 35 and the square root of the output of the summer is extracted in square root extractor 37. The output of the average magnitude generators 15 and 27 are multiplied in a multiplier 39. The output of multiplier 39 is adjusted by a predetermined gain in amplifier 41. The gain determines the balance angle, which is the boundary between normal and abnormal conditions. The output of amplifier 41 is connected to a negative input terminal of summer 13.

A restraint circuit 43 can also be provided which prevents the output of summer 13 from indicating a trip condition in response to a single phase fault. The restraint circuit comprises a summer 45, an absolute value circuit 47, a multiplier 49 and a amplifier 51. An operate signal from each static protective relay 1, 3 and 5 is summed in summer 45. The absolute value of the output of summer 45 is taken in circuit 47. The output of circuit 47 and the average magnitude of the polarizing signals from circuit 27 are multiplied in multiplier 49. The output of multiplier 49 is adjusted by the gain in amplifier 51 which is preselected to prevent summer 13 from indicating a trip in response to a single phase fault but still be responsive to multiphase faults. The output of amplifier 51 is coupled to a negative input terminal of summer 13. The output of summer 13 when positive indicates an abnormal condition calling for a three phase trip. The operation of squaring, summing and taking square root are readily achieved with electronic circuits.

The operation of the high speed multiphase fault detection apparatus of FIG. 1 will now be explained. Coincident detectors in each of the static protective relays will be relied on during single phase faults. For multiphase faults, the apparatus of FIG. 1 will detect three phase faults nearly instantaneously and will detect line-to-line and double-line-to-ground faults in no longer than 4.1 milliseconds. The multiphase faults detected are the same faults that a conventional coincident detector would see except that in the present apparatus they are detected very rapidly because an instantaneous estimate of the relative phase angle between operate and polarize signals from each static protective relay is made.

If the polarizing signals from static protective relays 1, 3 and 5 are given by:

$$X_i(t) = |X| \sin(\omega t + \phi_X - (i-1)2\pi/3); \quad i=1,2,3 \quad (1)$$

and operating signals by:

$$Y_i(t) = |Y| \sin(\omega t + \phi_Y - (i-1)2\pi/3); \quad i=1,2,3 \quad (2)$$

where $\phi_X + \phi_Y$ are the phase angles of the polarizing and operating signals respectively and $\omega$ is the angular frequency, then, using algebra and trigonometry it can be shown that:

$$\sum_{i=1}^{3} X_i(t) Y_i(t) = |X| |Y| \cos(\phi_X - \phi_Y) \quad (3)$$

and that:

$$\sum_{i=1}^{3} X_i^2(t) = |X|^2 \quad (4)$$

$$\sum_{i=1}^{3} Y_i^2(t) = |Y|^2 \quad (5)$$

Therefore, the three-phase trip signal in FIG. 1 without the restraint signal is given by:

$$T = |X||Y|[\cos(\phi_X - \phi_Y) - r] \quad (6)$$

T is greater than zero when:

$$|\phi_X - \phi_Y| < \cos^{-1}(r) \quad (7)$$

and indicates an abnormal condition. This is entirely equivalent to the characteristics of a coincidence timer, provided r and $\Delta t$ are related by:

$$\cos \omega \Delta t = r \quad (8)$$

Figure 2:
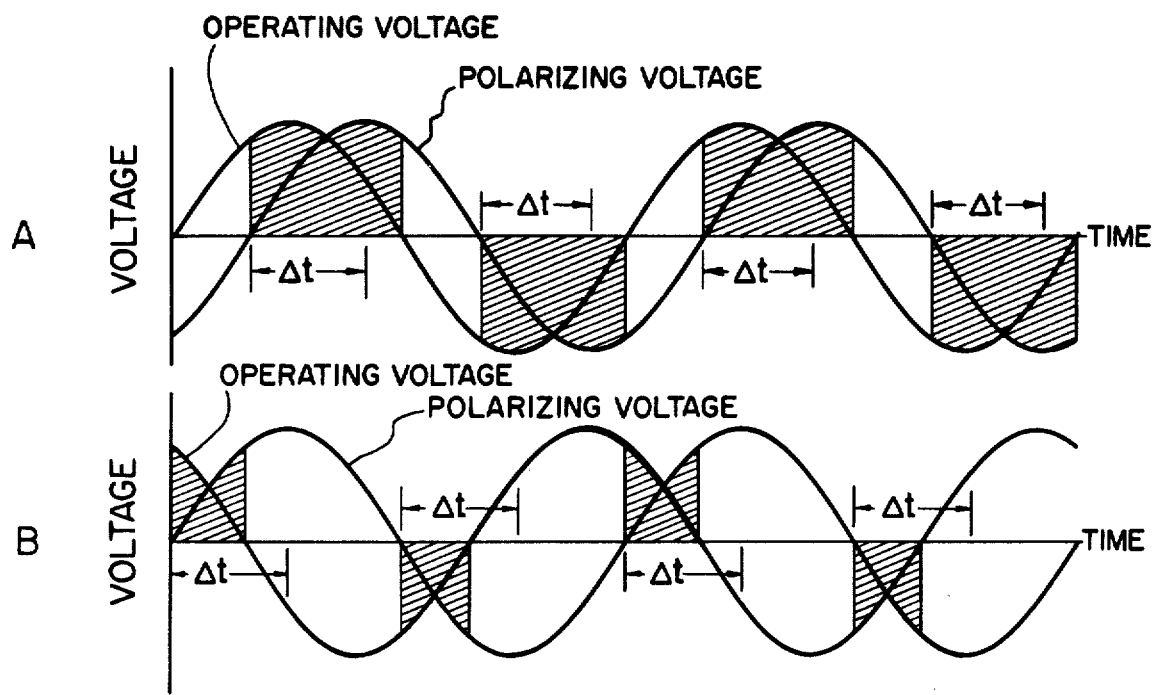
FIGS. 2a and 2b are waveforms showing phase angle detection by coincident measurement.

The $\Delta t$ quantity is the minimum time interval during which the input waveforms must have the same sign to be declared coincident. This is illustrated in FIGS. 2A and 2B. The waveforms in FIG. 2A are coincident whereas the waveforms in FIG. 2B are not. In conventional relays using the coincident scheme there is an inherent time delay. In the present invention the same faults are detected as would be detected in a coincident technique but because the angle difference between waveforms is estimated instantaneously the delays are greatly reduced. The value r in equation (8) is the gain used in amplifier 41. The present invention has a range of three phase reach characteristic identical to that of conventional relays. By choosing a reach characteristic using conventional guidelines the present circuit can be made to respond appropriately to load current and fault resistance. For example, on a heavily loaded, long line, the polyphase characteristic can be made lenticular by appropriately adjusting r. The single phase fault detection by the static protective relays 1, 3 and 5 can be set to have a circular or tomato shape to detect high resistance line-to-ground faults.

Figure 3:
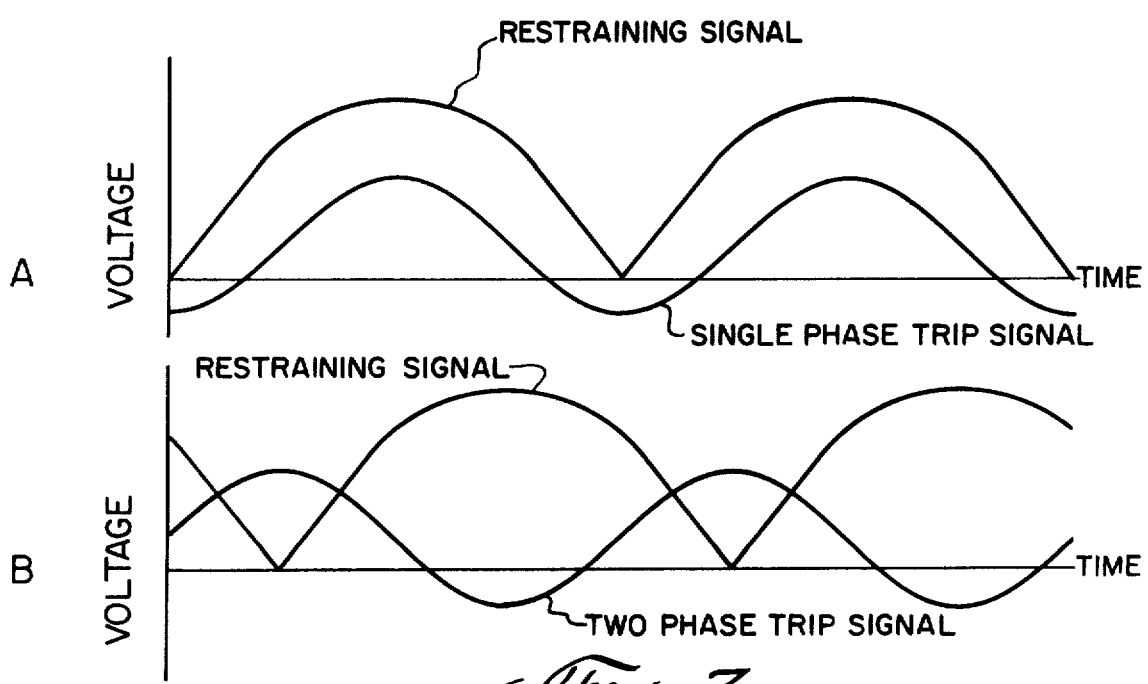
FIGS. 3a and 3b shows a restraint signal and a single phase trip signal and a restraint signal and a two trip signal, respectively.

The present invention is directed towards detecting multiphase faults. A single phase fault very close to the detection apparatus can cause the output of summer 13 to become positive and incorrectly indicate a multiphase fault. A restraint signal can be introduced to summer 13 by circuit 43 of FIG. 1. The value of amplifier 51 is such that the restraint signal is larger than the single phase trip signal and still permits multiphase trips to be detected. This value is $\sqrt{\frac{2}{3}} - r$ where r is defined in equation (6). During three phase and line-to-line faults the restraint signal has no effect on summer 13 output. For a single line-to-ground fault the output of summer 13 without the restraint signal and the restraint signal are shown in FIG. 3A. The peaks of the restraint signal occur at about the same time as the peaks of the trip signal and the restraint signal is larger. Since the restraint signal will be subtracted from the tripping signal, tripping is blocked and the conventional static protective relays 1, 3 and 5 are relied on for single phase tripping. If r as defined in equation (6) is greater than $\sqrt{\frac{2}{3}}$ the restraint signal is not necessary.

A double line to ground fault trip signal from summer 13 (without the restraint signal) and the corresponding restraint signal are shown in FIG. 3B. The peaks of the trip signal occur about the same time the restraint signal is zero. Thus, the reach of the relay is not greatly affected. The response is only slightly delayed compared to what it would be without the restraint signal being subtracted from the trip signal. The response is still much faster than with conventional schemes, with a detection delay range of from 0 to 4.1 milliseconds. This delay compares favorably to a detection time of 4.1 to 8.2 milliseconds for conventional coincident schemes in detecting double line to ground faults.

An apparatus has been described which achieves ultra high speed relaying without sacrificing power system security. Using conventional static relays, a relay is produced with unaltered reach characteristics, but which has an enhanced speed of response. The resultant relay responds most rapidly during multiphase faults and responds as do conventional schemes during single line to ground faults. During three phase faults, detection is practically instantaneous. Two phase faults take no longer than 4.1 milliseconds to be detected. Since multiphase faults are the greatest threat to power system stability, the present invention offers a significant improvement over conventional relaying techniques and system stability during faults by rapidly detecting short circuits. The short circuit detection can be used for tripping appropriate circuit breakers without sacrificing system security.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

What is claimed is:

1. A power system relay for rapidly detecting multiphase faults in transmission lines comprising:

means having an input of the multiphase voltage and currents of said transmission line for generating a polarizing signal and an operating signal for each input phase;

a first summing means;

means for multiplying the polarizing signal relating to one phase by the operating signal relating to the same phase and coupling the result for each phase to a different positive input of said summing means;

means for generating a signal indicative of the average amplitude of all said polarizing signals;

means for generating a signal indicative of the average amplitude of all said operating signals; and means for multiplying said average polarizing signals and said average operating signals together and adjusting the product by a predetermined gain, said gain determining the balance angle between phases, said adjusted product being coupled to a negative input of said summing means, said summing means output indicating an abnormal condition when it is above a predetermined value.

2. The power system of claim 1 further including:

means for restraining single phase faults from causing an abnormal condition indication at said first summing means while still detecting multiphase faults, said means comprising:

a second summing means for summing said operating signals;

means for determining the absolute value of the sum of said operating signals;

means for multiplying said absolute value of said operating signals and said average polarizing signals together and adjusting the product by a predetermined gain, said gain being a predetermined value selected to restrain single phase tripping and still permit multiphase tripping, said adjusted product being coupled to a negative input of said first summing means.

3. The relay in claim 1 wherein said means for generating a signal indicative of the average amplitude of all said operating signals comprises:

means for obtaining the square root of the sum of the squares of said operating signals.

4. The relay in claim 1 wherein said means for generating a signal indicative of the average amplitude of all said polarizing signals comprises:

means for obtaining the square root of the sum of the squares of said polarizing signals.

* * * * *